United States Patent
Fujita et al.

(10) Patent No.: US 11,532,410 B2
(45) Date of Patent: Dec. 20, 2022

(54) THERMISTOR, METHOD FOR MANUFACTURING SAME, AND THERMISTOR SENSOR

(71) Applicant: MITSUBISHI MATERIALS CORPORATION, Tokyo (JP)

(72) Inventors: Toshiaki Fujita, Naka (JP); Shunpei Suzuki, Naka (JP); Nagisa Sako, Naka (JP); Norihisa Chitose, Naka (JP); Noriaki Nagatomo, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 259 days.

(21) Appl. No.: 16/957,438

(22) PCT Filed: Dec. 17, 2018

(86) PCT No.: PCT/JP2018/047419
§ 371 (c)(1),
(2) Date: Jun. 24, 2020

(87) PCT Pub. No.: WO2019/131570
PCT Pub. Date: Jul. 4, 2019

(65) Prior Publication Data
US 2021/0074453 A1 Mar. 11, 2021

(30) Foreign Application Priority Data

Dec. 25, 2017 (JP) .............................. JP2017-247424
Oct. 29, 2018 (JP) .............................. JP2018-202680

(51) Int. Cl.
*H01C 7/04* (2006.01)
*G01K 7/22* (2006.01)
(Continued)

(52) U.S. Cl.
CPC ............. *H01C 7/041* (2013.01); *G01K 7/223* (2013.01); *H01C 1/1413* (2013.01);
(Continued)

(58) Field of Classification Search
CPC ...... H01C 7/041; H01C 1/1413; H01C 17/12; H01C 17/075; H01C 17/281; G01K 7/223
See application file for complete search history.

(56) References Cited

U.S. PATENT DOCUMENTS

| 5,363,084 A * | 11/1994 | Swinehart | H01C 10/08 338/195 |
| 5,367,285 A * | 11/1994 | Swinehart | H01C 7/006 338/308 |
| 2006/0170077 A1* | 8/2006 | Aoki | G02F 1/13439 257/642 |
| 2007/0295973 A1* | 12/2007 | Jinbo | H01L 27/1266 257/88 |
| 2015/0049788 A1* | 2/2015 | Fujita | C30B 25/06 204/192.15 |

FOREIGN PATENT DOCUMENTS

| JP | 2004-319737 A | 11/2004 |
| JP | 2013-179161 A | 9/2013 |

(Continued)

OTHER PUBLICATIONS

JP 2017163127, Chiba et al., machine translation (Description). (Year: 2017).*

(Continued)

*Primary Examiner* — Kyung S Lee
(74) *Attorney, Agent, or Firm* — Locke Lord LLP

(57) ABSTRACT

Provided is a thermistor which has a smaller change in resistance value between before and after a heat resistance test and from which a high B constant is obtained, a method for manufacturing the same, and a thermistor sensor. The thermistor is a thermistor formed on a substrate and includes: an intermediate stacked portion formed on the substrate; and a main metal nitride film layer formed of a thermistor material of a metal nitride on the intermediate stacked portion, wherein the intermediate stacked portion includes a base thermistor layer formed of a thermistor material of a metal nitride and an intermediate oxynitride layer formed on the base thermistor layer, the main metal nitride film layer is formed on the intermediate oxynitride layer, and the intermediate oxynitride layer is a metal oxynitride layer formed through oxidation of the thermistor material of the base thermistor layer immediately below the intermediate oxynitride layer.

9 Claims, 5 Drawing Sheets

(51) Int. Cl.
　　　 *H01C 1/14*　　　　(2006.01)
　　　 *H01C 17/075*　　 (2006.01)
　　　 *H01C 17/12*　　　(2006.01)
　　　 *H01C 17/28*　　　(2006.01)
(52) U.S. Cl.
　　　 CPC ........... *H01C 17/075* (2013.01); *H01C 17/12* (2013.01); *H01C 17/281* (2013.01)

(56) References Cited

FOREIGN PATENT DOCUMENTS

| | | |
|---|---|---|
| JP | 2014-123646 A | 7/2014 |
| JP | 2014-236204 A | 12/2014 |
| JP | 2015-53356 A | 3/2015 |
| JP | 2015-65408 A | 4/2015 |
| JP | 2015-65417 A | 4/2015 |
| JP | 2015-73075 A | 4/2015 |
| JP | 2015-73077 A | 4/2015 |
| JP | 2016-136609 A | 7/2016 |
| JP | 2017-163127 A | 9/2017 |

OTHER PUBLICATIONS

International Search Report dated Mar. 12, 2019, issued for PCT/JP2018/047419.

* cited by examiner

[Fig.1]
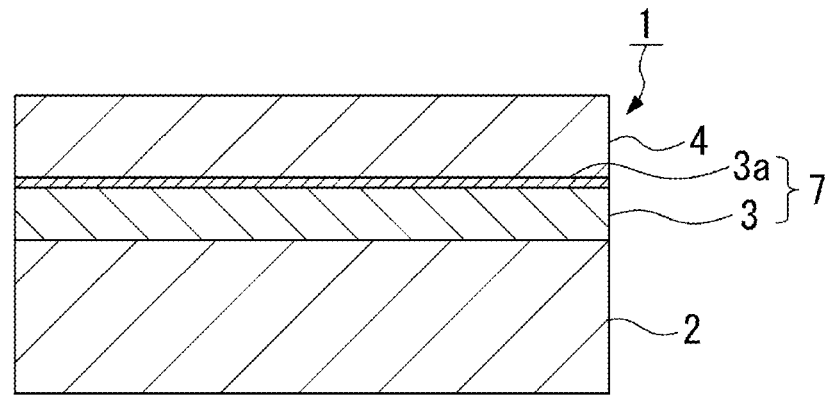
[Fig. 2(a)]
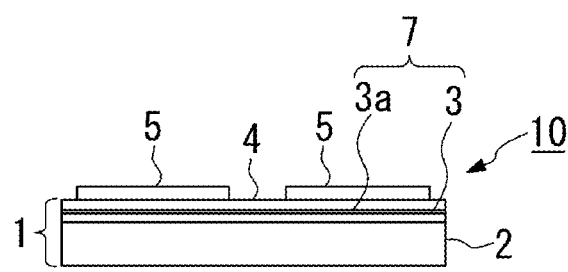
[Fig. 2(b)]
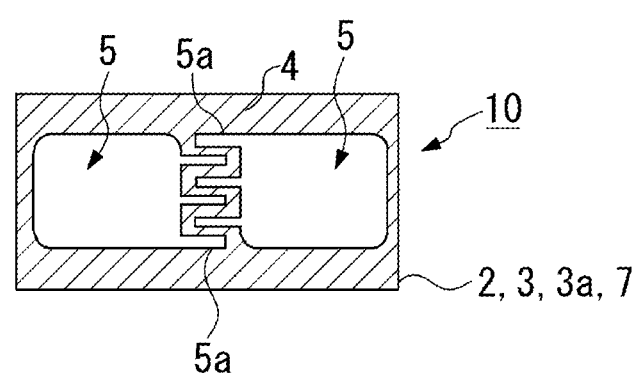

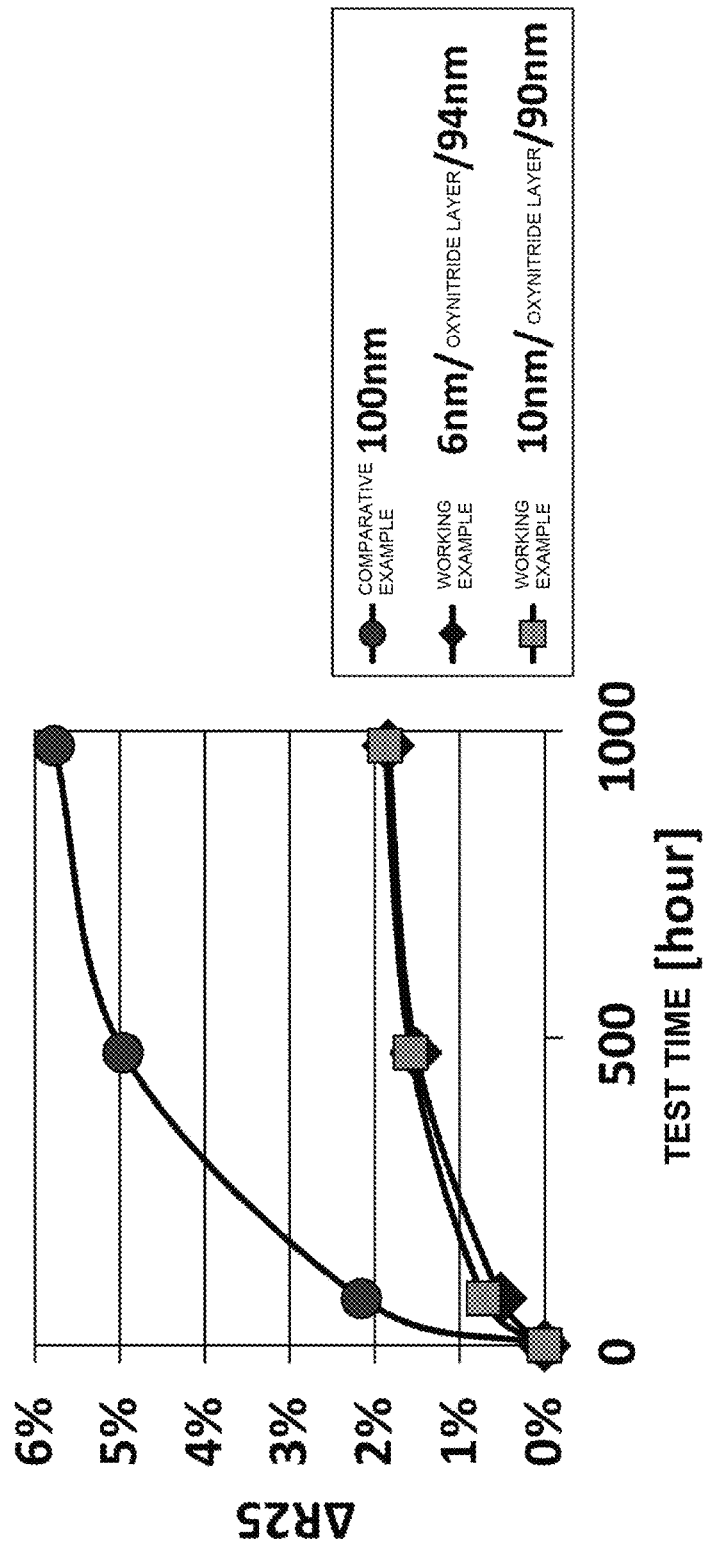
[Fig. 3]

[Fig. 4]
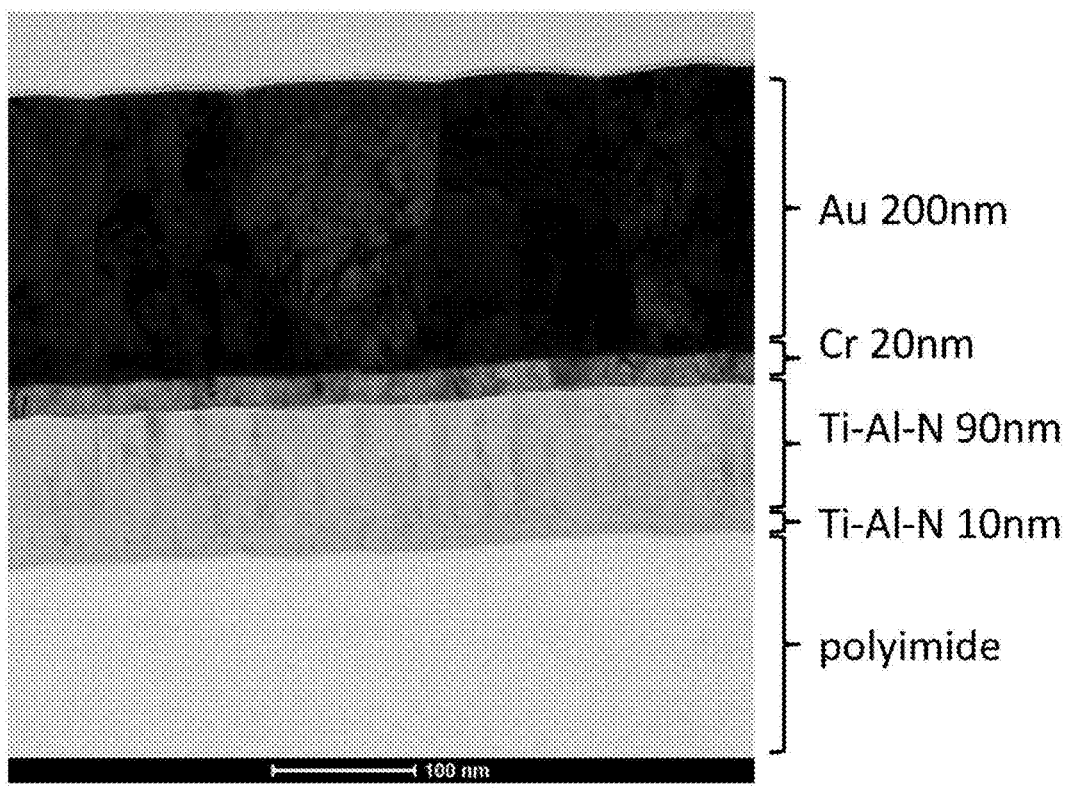

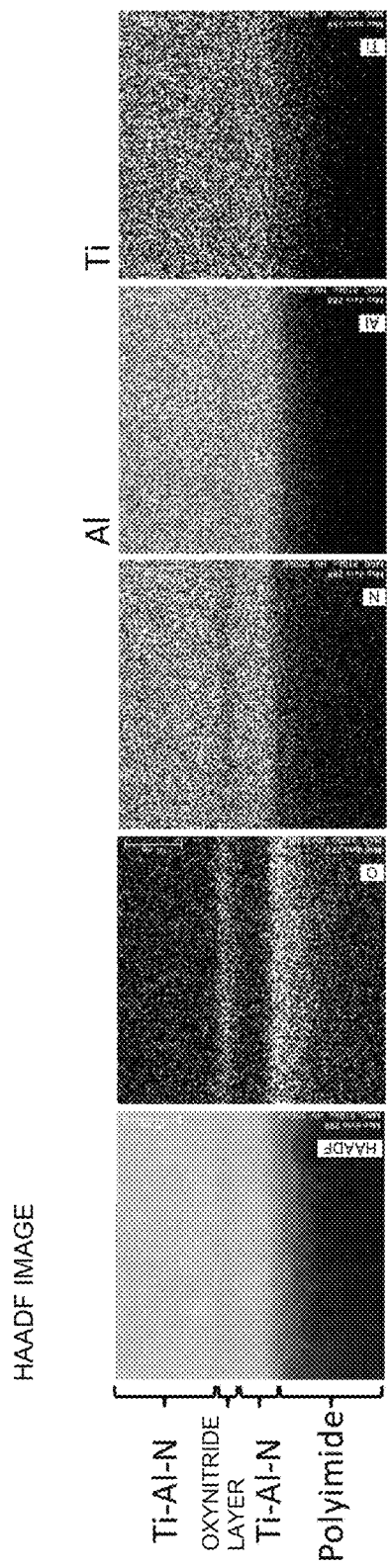
[Fig. 5]

[Fig. 6]
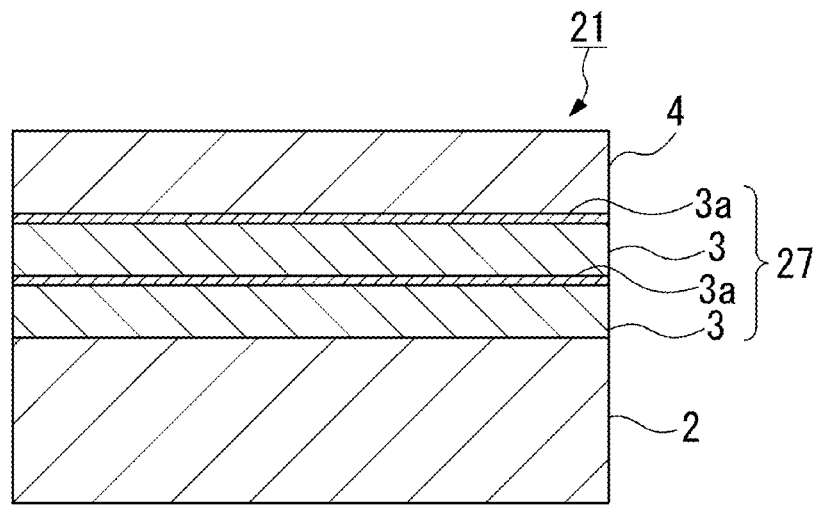

THERMISTOR, METHOD FOR MANUFACTURING SAME, AND THERMISTOR SENSOR

BACKGROUND OF THE INVENTION

Field of the Invention

The present invention relates to a thermistor from which a high B constant can be obtained, a method for manufacturing the same, and a thermistor sensor.

Description of the Related Art

In a thermistor material used for a temperature sensor or the like, a high B constant is required for a high accuracy and a high sensitivity. In recent years, a non-calcined metal nitride material for which heat treatment is not required and from which a high B constant is obtained has been developed as such a thermistor material.

For example, the present inventors have developed a metal nitride material for a thermistor which consists of a metal nitride represented by a general formula: $Ti_xAl_yN_z$ ($0.70 \leq y/(x+y) \leq 0.95$, $0.4 \leq z \leq 0.5$, $x+y+z=1$), and in which a crystal structure of the metal nitride is a hexagonal wurtzite-type single phase, as a metal nitride material for a thermistor that can directly be formed as a film on an insulating substrate without firing (Patent Document 1). In addition, they have developed a material which can be formed without calcination, is at least one nitride material of Ti, V, Cr, Mn, Fe, Co, Ni, Si, Cu and Al, and has the above-described crystal structure, and from which a high B constant is obtained (Patent Documents 2 to 7).

In addition, they also have developed a material which consists of a metal nitride represented by a general formula: $M_xAl_yN_z$ (where M represents at least one of Zr, Nb, Mo, Hf, Ta and W; $0.65 \leq y/(x+y) \leq 0.98$, $0.35 \leq z \leq 0.5$; $x+y+z=1$), in which a crystal structure of the metal nitride is a hexagonal wurtzite-type single phase, and from which a high B constant is obtained, as a metal nitride material for a thermistor that can directly be formed as a film on an insulating substrate without firing (Patent Document 8).

Furthermore, they also have developed a material which consists of a metal nitride represented by a general formula: $(M_{1-w}A_w)_xAl_yN_z$ (where M represents at least one of Ti, V, Cr, Mn, Fe and Co, and A represents at least one of Sc, Zr, Mo, Nb and W; $0.0<w<1.0$, $0.70 \leq y/(x+y) \leq 0.98$; $0.4 \leq z \leq 0.5$; and $x+y+z=1$) and in which a crystal structure of the metal nitride is a hexagonal wurtzite-type single phase (Patent Document 9).

PRIOR ART DOCUMENTS

Patent Documents

[Patent Document 1] Japanese Unexamined Patent Application Publication No. 2013-179161
[Patent Document 2] Japanese Unexamined Patent Application Publication No. 2014-123646
[Patent Document 3] Japanese Unexamined Patent Application Publication No. 2014-236204
[Patent Document 4] Japanese Unexamined Patent Application Publication No. 2015-65408
[Patent Document 5] Japanese Unexamined Patent Application Publication No. 2015-65417
[Patent Document 6] Japanese Unexamined Patent Application Publication No. 2015-73077
[Patent Document 7] Japanese Unexamined Patent Application Publication No. 2015-73075
[Patent Document 8] Japanese Unexamined Patent Application Publication No. 2016-136609
[Patent Document 9] Japanese Unexamined Patent Application Publication No. 2015-073075

SUMMARY OF THE INVENTION

Problems to be Solved by the Invention

The following problem remains in the above-described techniques in the related art.

That is, although favorable thermistor characteristics are obtained from the above-described metal nitride materials for a thermistor disclosed in each of the patent documents which have a high B constant and a relatively low change in resistance value and B constant between before and after a heat resistance test at 125° C., there is a demand for further suppressing the change in resistance value between before and after the heat resistance test at a higher temperature of 250° C. or the like.

The present invention has been made in consideration of the above-described problem, and an object of the present invention is to provide a thermistor which has a smaller change in resistance value between before and after a heat resistance test and from which a high B constant is obtained, a method for manufacturing the same, and a thermistor sensor.

Means for Solving the Problems

The present invention employs the following configuration to solve the problem. That is, a thermistor according to a first aspect of the present invention is a thermistor formed on a substrate, the thermistor including: an intermediate stacked portion formed on the substrate; and a main metal nitride film layer formed of a thermistor material of a metal nitride on the intermediate stacked portion, wherein the intermediate stacked portion includes one or plural pairs of two layers which are a base thermistor layer formed of a thermistor material of a metal nitride and an intermediate oxynitride layer formed on the base thermistor layer and are stacked, the main metal nitride film layer is formed on the intermediate oxynitride layer which is an uppermost portion of the intermediate stacked portion, and the intermediate oxynitride layer is a metal oxynitride layer formed through oxidation of the thermistor material of the base thermistor layer immediately below the intermediate oxynitride layer.

In this thermistor, since the intermediate oxynitride layer is a metal oxynitride layer formed through oxidation of the thermistor material of the base thermistor layer immediately below the intermediate oxynitride layer, the intermediate oxynitride layer has the same constituent elements as those of the base thermistor layer except for oxygen. In addition, a high-quality main metal nitride film layer consisting of common elements except for oxygen can be formed, the intermediate oxynitride layer of the metal oxynitride layer functions as a barrier layer for suppressing an influence due to moisture or impurities in the base thermistor layer or defects of the base thermistor layer, and a main metal nitride film layer having a small change in resistance value even after a heat resistance test can be obtained.

A thermistor according to a second aspect of the present invention is characterized by the thermistor according to the first aspect, wherein the base thermistor layer and the main metal nitride film layer have the same composition.

That is, since the base thermistor layer and the main metal nitride film layer in this thermistor have the same composition, a main metal nitride film layer having high crystallinity and high reliability can be formed. By making the compositional ratios of A/(M+A) the same, the lattice constants of both layers become the same, and a difference in internal stress between both layers becomes extremely small, thereby the difference in thermal expansion becoming extremely small. Accordingly, higher reliability can be obtained.

A thermistor according to a third aspect of the present invention is characterized by the thermistor according to the first or second aspect, wherein the intermediate stacked portion includes plural pairs of the base thermistor layer and the intermediate oxynitride layer in this order which are repeatedly stacked on the substrate.

That is, in this thermistor, since the intermediate stacked portion includes plural pairs of the two layers of the base thermistor layer and the intermediate oxynitride layer in this order which are repeatedly stacked on the substrate, the effect as a barrier layer can be further improved.

A thermistor according to a fourth aspect of the present invention is characterized by the thermistor according to any one of the first to third aspects, wherein the base thermistor layer and the main metal nitride film layer are formed of M-A-N (where M represents at least one of Ti, V, Cr, Mn, Fe, Co, Ni and Cu, and A represents Al or (Al and Si)), M'-Al—N (where M' represents at least one of Zr, Nb, Mo, Hf, Ta and W), or G-A'-Al—N (where, G represents at least one of Ti, V, Cr, Mn, Fe and Co, and A' represents at least one of Sc, Zr, Mo, Nb and W), and a crystal structure of the main metal nitride film layer is a hexagonal wurtzite-type single phase.

That is, in this thermistor, since the base thermistor layer and the main metal nitride film layer are formed of M-A-N (where M represents at least one of Ti, V, Cr, Mn, Fe, Co, Ni and Cu, and A represents Al or (Al and Si)), M'-Al—N (where M' represents at least one of Zr, Nb, Mo, Hf, Ta and W), or G-A'-Al—N (where G represents at least one of Ti, V, Cr, Mn, Fe and Co, and A' represents at least one of Sc, Zr, Mo, Nb and W) and a crystal structure of the main metal nitride film layer is a hexagonal wurtzite-type single phase, a high B constant can be obtained.

A thermistor according to a fifth aspect of the present invention is characterized by the thermistor according to the fourth aspect, wherein the base thermistor layer and the main metal nitride film layer are formed of the M-A-N, the M element in the M-A-N is Ti, and the A element is Al.

That is, the base thermistor layer and the main metal nitride film layer are both formed of Ti—Al—N.

A thermistor according to a sixth aspect of the present invention is characterized by the thermistor according to any one of the first to fifth aspects, wherein the substrate is an insulating film.

That is, in this thermistor, even if the substrate is an insulating film which is an organic substrate such as polyimide, a favorable main metal nitride film layer can be obtained. In addition, since the substrate is an insulating film, if the above-described base thermistor layer, intermediate oxynitride layer, and main metal nitride film layer which have flexibility are formed, all the layers can have flexibility. Therefore, the layers can be used as a flexible thermistor that can be, for example, installed in a bent state.

A thermistor sensor according to a seventh aspect of the present invention includes: the thermistor according to any one of the first to sixth aspects of the present invention; and a pair of counter electrodes formed on the main metal nitride film layer opposite to each other.

That is, since this thermistor sensor includes the thermistor according any one of the first to sixth aspects, a thermistor sensor having favorable thermistor characteristics and a small change in resistance value even after a heat resistance test is obtained.

A method for manufacturing a thermistor according to an eighth aspect of the present invention is a manufacturing method for manufacturing the thermistor according to any one of the first to sixth aspects of the present invention, the method including: an intermediate stacked portion forming step of forming an intermediate stacked portion on a substrate; and a main metal nitride film layer forming step of forming the main metal nitride film layer with a thermistor material of a metal nitride on the intermediate stacked portion, wherein the intermediate stacked portion forming step includes two steps which are a base thermistor layer forming step of forming the base thermistor layer with a thermistor material of a metal nitride and an intermediate oxynitride layer forming step of forming an intermediate oxynitride layer on the base thermistor layer and are performed once or repeated plural times, wherein in the main metal nitride film layer forming step, the main metal nitride film layer is formed on the intermediate oxynitride layer which is an uppermost portion of the intermediate stacked portion, and wherein in the intermediate oxynitride layer forming step, the intermediate oxynitride layer is formed by oxidizing a surface of the base thermistor layer.

That is, in this method for manufacturing a thermistor, since the intermediate oxynitride layer is formed by oxidizing a surface of the base thermistor layer in the intermediate oxynitride layer forming step, it is unnecessary to prepare a sputtering target or the like separately to provide a film forming step for the intermediate oxynitride layer. Therefore, the intermediate oxynitride layer of the metal oxynitride layer can be easily obtained at low cost.

In the method for manufacturing a thermistor according to a ninth aspect of the present invention is characterized by the method according to the eighth aspect, wherein the two steps of the base thermistor layer forming step and the intermediate oxynitride layer forming step are repeated plural times in this order in the intermediate stacked portion forming step.

That is, in this method for manufacturing a thermistor, since the two steps of the base thermistor layer forming step and the intermediate oxynitride layer forming step are repeated plural times in this order in the intermediate stacked portion forming step, a plurality of base thermistor layers and intermediate oxynitride layers can be stacked, and a thermistor having a superior barrier layer effect can be manufactured.

Effects of the Invention

According to the present invention, the following effects can be obtained.

That is, according to the thermistor of the present invention, since the intermediate oxynitride layer is a metal oxynitride layer formed through oxidation of the thermistor material of the base thermistor layer immediately below the intermediate oxynitride layer, the intermediate oxynitride layer has the same constituent elements as those of the base thermistor layer except for oxygen. In addition, a high-quality main metal nitride film layer consisting of common elements except for oxygen can be formed, the intermediate oxynitride layer of the metal oxynitride layer functions as a barrier layer for suppressing an influence due to moisture or impurities in the base thermistor layer or defects of the base thermistor layer, and a main metal nitride film layer having a small change in resistance value even after a heat resistance test can be obtained.

Accordingly, when a heat resistance test is performed, an influence due to moisture or impurities in the base thermistor layer or defects of the base thermistor layer on the main metal nitride film layer is suppressed by the intermediate oxynitride layer. Therefore, the change in resistance value after the heat resistance test can be further suppressed compared to a case where a main metal nitride film layer is directly formed on a substrate.

In addition, according to the method for manufacturing a thermistor of the present invention, since the intermediate oxynitride layer is formed by oxidizing a surface of the base thermistor layer in the intermediate oxynitride layer forming step, it is unnecessary to prepare a sputtering target or the like separately to provide a film forming step for the intermediate oxynitride layer. Therefore, the intermediate oxynitride layer of the metal oxynitride layer can be easily obtained at low cost.

Furthermore, according to the thermistor sensor of the present invention, since the thermistor sensor includes the thermistor of the above-described aspects of the present invention, a thermistor sensor having favorable thermistor characteristics and a small change in resistance value even after a heat resistance test is obtained.

BRIEF DESCRIPTION OF THE DRAWINGS

FIG. 1 is a cross-sectional view showing a thermistor in a first embodiment of a thermistor, a method for manufacturing the same, and a thermistor sensor according to the present invention.

FIGS. 2(a) and (b) show a front view, FIG. 2(a), and a plan view, FIG. 2(b), illustrating a thermistor sensor and a film evaluation element in working examples according to the present embodiment and the present invention.

FIG. 3 is a graph showing a resistance value change rate at 25° C. after a heat resistance test at 250° C. in the working examples and a comparative example of the thermistor, the method for manufacturing the same, and the thermistor sensor according to the present invention.

FIG. 4 is a cross-sectional TEM image showing a thermistor in the working examples according to the present invention.

FIG. 5 shows a cross-sectional HAADF image and TEM-EDS images of oxygen, nitrogen, Al, and Ti which show a thermistor in the working examples according to the present invention.

FIG. 6 is a cross-sectional view showing a thermistor in a second embodiment of a thermistor, a method for manufacturing the same, and a thermistor sensor according to the present invention.

DESCRIPTION OF THE EMBODIMENTS

Hereinafter, a first embodiment of a thermistor, a method for manufacturing the same, and a thermistor sensor according to the present invention will be described with reference to FIGS. 1 and 2. In the drawings used in the following description, the scale is appropriately changed as necessary in order to make each part have a size recognizable or easily recognizable.

A thermistor 1 of the present embodiment is a thermistor formed on a substrate 2 as shown in FIG. 1 and includes: an intermediate stacked portion 7 formed on the substrate 2; and a main metal nitride film layer 4 formed of a thermistor material of a metal nitride on the intermediate stacked portion 7.

The intermediate stacked portion 7 includes a pair of two layers which are a base thermistor layer 3 formed of a thermistor material of a metal nitride and an intermediate oxynitride layer 3a formed on the base thermistor layer 3 and are stacked.

The main metal nitride film layer 4 is formed on the intermediate oxynitride layer 3a which is a metal oxynitride layer formed through oxidation of the thermistor material of the base thermistor layer 3 immediately below the intermediate oxynitride layer 3a.

The base thermistor layer 3 and main metal nitride film layer 4 are formed of M-A-N (where M represents at least one of Ti, V, Cr, Mn, Fe, Co, Ni and Cu, and A represents Al or (Al and Si)), M'-Al—N (where M' represents at least one of Zr, Nb, Mo, Hf, Ta and W), or G-A'-Al—N (where G represents at least one of Ti, V, Cr, Mn, Fe and Co, and A' represents at least one of Sc, Zr, Mo, Nb and W).

A crystal structure of the above-described main metal nitride film layer 4 is a hexagonal wurtzite-type single phase.

In addition, the intermediate oxynitride layer 3a is a metal oxynitride layer formed through oxidation of the thermistor material of the base thermistor layer 3 immediately below the intermediate oxynitride layer 3a. That is, the intermediate oxynitride layer 3a is an oxide layer of M-A-N (where M represents at least one of Ti, V, Cr, Mn, Fe, Co, Ni and Cu, and A represents Al or (Al and Si)), M'-Al—N (where M' represents at least one of Zr, Nb, Mo, Hf, Ta and W), or G-A'-Al—N (where G represents at least one of Ti, V, Cr, Mn, Fe and Co, and A' represents at least one of Sc, Zr, Mo, Nb and W). In the present embodiment, the intermediate oxynitride layer 3a is formed by oxidizing a surface of the base thermistor layer 3 immediately below the intermediate oxynitride layer 3a. That is, the base thermistor layer 3 of the present embodiment is an initial film formation layer for forming the intermediate oxynitride layer 3a.

The film thickness of the base thermistor layer 3 is preferably 6 to 10 nm.

The film thickness of the intermediate oxynitride layer 3a is about 1 nm.

The film thickness of the main metal nitride film layer 4 is, for example, 90 nm.

In the present embodiment, the base thermistor layer 3 and the main metal nitride film layer 4 consist of a metal nitride represented by a general formula: $M_xA_yN_z$ (where M represents at least one of Ti, V, Cr, Mn, Fe, Co, Ni and Cu, and A represents Al or (Al and Si); $0.70 \leq y/(x+y) \leq 0.98$; $0.4 \leq z \leq 0.5$; and $x+y+z=1$), a metal nitride represented by a general formula: $M'_xAl_yN_z$ (where M' represents at least one of Zr, Nb, Mo, Hf, Ta and W; $0.65 \leq y/(x+y) \leq 0.98$; $0.35 \leq z \leq 0.5$; and $x+y+z=1$), or a metal nitride represented by a general formula: $(G_{1-w}A'_w)_xAl_yN_z$ (where G represents at least one of Ti, V, Cr, Mn, Fe and Co, and A' represents at least one of Sc, Zr, Mo, Nb and W; $0.0<w<1.0$; $0.70 \leq y/(x+y) \leq 0.98$; $0.4 \leq z \leq 0.5$; and $x+y+z=1$).

The base thermistor layer 3 has electrical conductivity and exhibits thermistor characteristics.

In addition, the crystal structure of the main metal nitride film layer 4 is a hexagonal wurtzite-type (space group P6₃mc (No. 186)) single phase as described above, and is a film having thermistor characteristics. A is Al or (Al and Si), that is, Al or Al and Si and contains at least Al.

The main metal nitride film layer 4 has a crystal orientation with a large c-axis orientation degree in a direction perpendicular to the surface of the substrate (film thickness direction). The crystal phase is identified by grazing incidence X-ray diffraction in which a Cu bulb is used, and the incidence angle is set to 1 degree. For determination as to whether a-axis orientation (100) or c-axis orientation (002) is strong in the direction perpendicular to the surface of a film (film thickness direction), orientation of a crystal axis is examined using the above-described X-ray diffraction (XRD), and in a case where "peak intensity of (100)"/"peak intensity of (002)" which is a peak intensity ratio of (100) (hkl index indicating a-axis orientation) to (002) (hkl index indicating c-axis orientation) is less than 1, it is assumed that the c-axis orientation is strong. In a case of using a transmission electron microscope (TEM), it can be confirmed that the c-axis orientation degree is high in the film thickness direction of the main metal nitride film layer 4 by acquiring an electron beam diffraction image of a film cross-section.

In addition, the main metal nitride film layer 4 is a dense columnar crystallized film. This can be confirmed through evaluation of a crystal form of cross-sectional SEM or cross-sectional TEM.

The base thermistor layer 3 and the main metal nitride film layer 4 preferably have the same composition.

In the present embodiment, the base thermistor layer 3 and the main metal nitride film layer 4 are formed of M-A-N, the M element in the M-A-N is Ti, and the A element is Al, for example. In particular, the base thermistor layer 3 and the main metal nitride film layer 4 consist of a metal nitride represented by a general formula: $Ti_xAl_yN_z$ ($0.70 \leq y/(x+y) \leq 0.95$, $0.4 \leq z \leq 0.5$, $x+y+z=1$).

Regarding the above-described crystalline $M_xA_yN_z$ which is the main metal nitride film layer 4, in a case where "y/(x+y)" (that is, A/(M+A)) is less than 0.70, a wurtzite-type single phase is not obtained, but a coexistence phase with an NaCl-type phase or an only NaCl-type crystal phase is obtained. Accordingly, a sufficiently high resistance and B constant are not obtained.

In addition, in a case where "y/(x+y)" (that is, A/(M+A)) exceeds 0.98, the material exhibits extremely high resistivity and high insulating property. Therefore, the material cannot be applied as a thermistor material.

In addition, in a case where "z" (that is, N/(M+A+N)) is less than 0.4, the nitridation amount of metal is small. Therefore, a wurtzite-type single phase is not obtained, and a sufficiently high resistance and B constant are not obtained.

Furthermore, in a case where "z" (that is, N/(M+A+N)) exceeds 0.5, a wurtzite-type single phase cannot be obtained. This is due to the fact that the stoichiometric ratio in a case where there is no defect at a nitrogen site in the wurtzite-type single phase is 0.5 (that is, N/(M+A+N)=0.5).

The crystal phase is identified by grazing incidence X-ray diffraction, in which a Cu bulb is used and the incidence angle is set to 1 degree.

As described above, the wurtzite-type crystal structure is a hexagonal space group $P6_3mc$ (No. 186), in which M and A belong to the same atomic sites (M represents at least one of Ti, V, Cr, Mn, Fe, Co, Ni and Cu, and A represents Al or (Al and Si)) in a so-called solid solution state. The wurtzite type has a vertex connection structure of a (M, A) N4 tetrahedron, the nearest site of the (M, A) site is N (nitrogen), and (M, A) has a nitrogen 4-coordination.

Similarly, V (vanadium), Cr (chromium), Mn (manganese), Fe (iron), Co (cobalt), Ni (nickel), and Cu (copper) other than Ti can be present at the same atomic site as that of Ti in the above-described crystal structure, and can be an M element. An effective ionic radius is a physical property value which is often used to ascertain the distance between atoms. It can be assumed that wurtzite-type $M_xA_yN_z$ (where M represents at least one of Ti, V, Cr, Mn, Fe, Co, Ni and Cu, and A represents Al or (Al and Si)) can be logically obtained particularly using a literature value from well-known Shannon's ionic radii.

An effective ionic radius in each of the ionic species of Al, Ti, V, Cr, Mn, Fe, Co, Ni, Cu and Si is shown in the following Table 1 (Reference Paper: R. D. Shannon, Acta Crystallogr., Sect. A, 32, 751 (1976)).

TABLE 1

Effective ionic radius
Reference Paper: R. D. Shannon, Acta Crystallogr., Sect. A, 32, 751 (1976)

| 4-Coordination | | 6-Coordination (reference) | |
|---|---|---|---|
| Ionic species | Ionic radius | Ionic species | Ionic radius |
| $Al^{3+}$ | 0.039 | $Al^{3+}$ | 0.0535 |
| $Ti^{4+}$ | 0.042 | $Ti^{3+}$ | 0.067 |
| $V^{5+}$ | 0.0355 | $V^{3+}$ | 0.064 |
| $Cr^{4+}$ | 0.041 | $Cr^{3+}$ | 0.0615 |
| $Cr^{5+}$ | 0.0345 | | |
| $Mn^{2+}$ | 0.066 | $Mn^{3+}$ (HS) | 0.0645 |
| $Mn^{4+}$ | 0.039 | | |
| $Mn^{5+}$ | 0.033 | $Mn^{3+}$ (LS) | 0.058 |
| $Fe^{2+}$ | 0.063 | $Fe^{3+}$ (HS) | 0.0645 |
| $Fe^{3+}$ | 0.049 | $Fe^{3+}$ (LS) | 0.055 |
| $Co^{2+}$ | 0.058 | $Co^{3+}$ (HS) | 0.061 |
| $Co^{4+}$ | 0.04 | $Co^{3+}$ (LS) | 0.0545 |
| $Ni^{2+}$ | 0.055 | $Ni^{3+}$ (HS) | 0.060 |
| | | $Ni^{3+}$ (LS) | 0.056 |
| $Cu^{2+}$ | 0.057 | $Cu^{3+}$ (LS) | 0.054 |
| $Si^{4+}$ | 0.026 | $Si^{4+}$ | 0.040 |

Unit: nm

The wurtzite type is a 4-coordination, and when the effective ionic radius of the 4-coordination is seen with respect to M, Ni<Cu<Co<Fe<Mn in a case of divalence, Al<Fe in a case of trivalence, Mn<Co<Cr<Ti in a case of tetravalence, and Cr<V in a case of pentavalence. From these results, it is considered that (Al, Cu, Co, Fe, Ni, Mn)<Cr<(V, Ti) (the size relation in ionic radius between Ti and V or among Cu, Co, Fe, Ni, Mn and Al cannot be determined.) However, since the valences of 4-coordination data are different from each other, these cannot be strictly compared with each other. Therefore, the comparison is made using 6-coordination (MN 6 octahedron) data when fixed to a trivalent ion as a reference. HS in Table 1 indicates a high spin state, and LS indicates a low spin state. It can be seen that, in the case of the low spin state (LS), the ionic radius satisfies Al<Cu<Co<Fe<Ni<Mn<Cr<V<Ti (in the case of the high spin state, the ionic radius of Mn, Fe, Co and Ni is larger than the ionic radius of Al and smaller than the ionic radius of Ti.)

In the present invention, carrier doping is performed by replacing an Al site of crystalline Al—N which is a nitride insulator having a wurtzite-type crystal structure with M such as Ti, and electrical conduction is increased to obtain thermistor characteristics. However, in a case where, for example, an Al site is replaced with Ti, since the effective ionic radius of Ti is larger than that of Al, the average ionic radius of Al and Ti increases. As a result, it can be assumed that the distance between atoms increases and the lattice constant increases.

In reality, in Patent Documents 2 to 7, wurtzite-type $M_xA_yN_z$ (where M represents at least one of Ti, V, Cr, Mn, Fe, Co, Ni and Cu, and A represents Al or (Al and Si)) is obtained and thermistor characteristics are obtained. In addition, it has been reported that the increase in the lattice constant caused by replacing an Al site of crystalline Al—N with Ti or the like is confirmed from X-ray data. Regarding Si, although the size relation in ionic radius between Si and Al cannot be determined from Table 1, it has been reported in Patent Document 5 that $M_xA_yN_z$ containing both Al and Si has a wurtzite-type crystal structure and thermistor characteristics are obtained.

In addition, regarding the above-described crystalline $M'_xAl_yN_z$ which is the main metal nitride film layer 4, in a case where "y/(x+y)" (that is, Al/(M'+Al)) is less than 0.65, a wurtzite-type single phase is not obtained, but a coexistence phase with an NaCl-type phase or an only NaCl-type crystal phase is obtained for a part of the M' element. Accordingly, a sufficiently high resistance and B constant are not obtained.

In addition, in a case where "y/(x+y)" (that is, Al/(M'+Al)) exceeds 0.98, the material exhibits extremely high resistivity and high insulating properties. Therefore, the material cannot be applied as a thermistor material.

In addition, in a case where "z" (that is, N/(M'+Al+N)) is less than 0.35, the nitridation amount of metal is small. Therefore, a wurtzite-type single phase is not obtained, and a sufficiently high resistance and B constant are not obtained.

In addition, in a case where "z" (that is, N/(M'+Al+N)) exceeds 0.5, a wurtzite-type single phase cannot be obtained. This is due to the fact that the stoichiometric ratio in a case where there is no defect at a nitrogen site in the wurtzite-type single phase is 0.5 (that is, N/(M'+Al+N)=0.5).

In reality, in a metal nitride represented by wurtzite-type $M'_xAl_yN_z$ (where M' represents at least one of Zr, Nb, Mo, Hf, Ta and W; $0.65 \leq y/(x+y) \leq 0.98$; $0.35 \leq z \leq 0.5$; and x+y+z=1) in Patent Document 8, thermistor characteristics such as a favorable B constant are obtained without firing.

Furthermore, regarding the above-described crystalline $(G_{1-w}A'_w)_xAl_yN_z$ which is the main metal nitride film layer 4, in a case where "y/(x+y)" (that is, Al/(G+A'+Al)) is less than 0.70, a wurtzite-type single phase is not obtained, but a coexistence phase with an NaCl-type phase or an only NaCl-type crystal phase is obtained. Accordingly, a sufficiently high resistance and B constant are not obtained.

In addition, in a case where "y/(x+y)" (that is, Al/(G+A'+Al)) exceeds 0.98, the material exhibits extremely high resistivity and high insulating properties. Therefore, the material cannot be applied as a thermistor material.

In addition, in a case where "z" (that is, N/(G+A'+Al+N)) is less than 0.4, the nitridation amount of metal is small. Therefore, a wurtzite-type single phase is not obtained, and a sufficiently high resistance and B constant are not obtained.

Furthermore, in a case where "z" (that is, N/(G+A'+Al+N)) exceeds 0.5, a wurtzite-type single phase cannot be obtained. This is due to the fact that the stoichiometric ratio in a case where there is no defect at a nitrogen site in the wurtzite-type single phase is 0.5 (that is, N/(G+A'+Al+N)=0.5).

In reality, in a metal nitride represented by wurtzite-type $(G_{1-w}A'_w)_xAl_yN_z$ (where G represents at least one of Ti, V, Cr, Mn, Fe and Co, and A' represents at least one of Sc, Zr, Mo, Nb and W; $0.0 < w < 1.0$, $0.70 \leq y/(x+y) \leq 0.98$; $0.4 \leq z \leq 0.5$; and x+y+z=1) in Patent Document 9, thermistor characteristics such as a favorable B constant are obtained without firing.

An insulating film such as polyimide is employed as the above-described substrate 2. Although the insulating film can also be produced using polyethylene terephthalate (PET), polyethylene naphthalate (PEN), and the like in addition to polyimide, flexibility and heat resistance are required. For example, a polyimide film which can be used at a high temperature because it has a high maximum use temperature of about 200° C., and has excellent heat resistance is desirable for measuring the temperature of a fixing roller. In recent years, a polyimide film which can be used at a temperature of 200° C. or higher and has extremely excellent heat resistance has been developed.

Next, a thermistor sensor using the thermistor of the present embodiment will be described. As shown in FIGS. 2(a) and (b), a thermistor sensor 10 includes the substrate 2 of the thermistor 1, the intermediate stacked portion 7 (base thermistor layer 3 and intermediate oxynitride layer 3a), the main metal nitride film layer 4, and a pair of counter electrodes 5 formed on the main metal nitride film layer 4 opposite to each other.

A pair of the above-described counter electrodes 5 are, for example, pattern-formed with a stacked metal film of a Cr film and an Au film, face each other on the main metal nitride film layer 4, and have a comb-shaped pattern with a plurality of comb portions 5a.

A method for manufacturing the above-described thermistor 1 and a method for manufacturing the thermistor sensor 10 using the same will be described below.

The method for manufacturing the thermistor 1 of the present embodiment includes an intermediate stacked portion forming step of forming the intermediate stacked portion 7 on the substrate 2 and a main metal nitride film layer forming step of forming the main metal nitride film layer 4 with a thermistor material of a metal nitride on the intermediate stacked portion 7.

The intermediate stacked portion forming step includes two steps of a base thermistor layer forming step of forming the base thermistor layer 3 with a thermistor material of a metal nitride and an intermediate oxynitride layer forming step of forming the intermediate oxynitride layer 3a on the base thermistor layer 3.

The main metal nitride film layer is formed on the intermediate oxynitride layer 3a in the main metal nitride film layer forming step, and the intermediate oxynitride layer 3a is formed by oxidizing the surface of the base thermistor layer 3 in the intermediate oxynitride layer forming step.

In order to form the main metal nitride film layer 4 and the base thermistor layer 3 which becomes the intermediate stacked portion 7, a metal nitride film having thermistor characteristics is formed through a reactive sputtering method in a nitrogen-containing atmosphere, for example. Regarding the film thickness at this time, the total thickness of the base thermistor layer 3 before oxidizing the surface and the main metal nitride film layer 4 is set to, for example, 100 nm.

For example, in a case of M=Ti and A=Al, the sputtering conditions at that time are set to, for example, an ultimate vacuum degree of $4 \times 10^{-5}$ Pa, a sputtering gas pressure of 0.2 Pa, target input power (output) of 200 W, and a nitrogen gas partial pressure of 30% in a mixed gas atmosphere of Ar gas and nitrogen gas, and a Ti—Al alloy sputtering target having a Al/(Al+Ti) compositional ratio of 0.85 is used.

In the base thermistor layer forming step, the base thermistor layer 3 is formed to have, for example, a film thickness of 10 nm. In the intermediate oxynitride layer forming step, the surface of the base thermistor layer 3 is oxidized by performing a natural oxidation treatment for 5 minutes in atmospheric air at room temperature to form the intermediate oxynitride layer 3a having a thickness of about 1 nm, for example. This intermediate oxynitride layer 3a is formed through oxidation of the surface of the base thermistor layer 3 made of a metal nitride, and therefore, is a metal oxynitride layer.

A heat treatment at 150° C. or the like in atmospheric air may be used as a method of the oxidation treatment.

Thereafter, the main metal nitride film layer 4 having a film thickness of 90 nm is formed in the main metal nitride film layer forming step under the same sputtering conditions as those of the base thermistor layer forming step again.

In addition, in the case of manufacturing the thermistor sensor 10 of the present embodiment, a Cr film with a thickness of 20 nm is formed and further an Au film with a thickness of 200 nm is formed on the main metal nitride film layer 4 through a sputtering method, for example. Furthermore, a resist liquid is applied thereon using a bar coater and is then pre-baked at 110° C. for 1 minute and 30 seconds and exposed to light with a light exposure device. Then, an unnecessary portion is removed with a developing solution, and patterning is performed through post-baking performed at 150° C. for 5 minutes. Thereafter, wet etching is performed on an unnecessary electrode portion with commercially available AU etchant and Cr etchant, and counter electrodes 5 having desired comb portions 5a are formed as shown in FIGS. 2(a) and (b) through resist stripping. In this manner, the thermistor sensor 10 of the present embodiment is manufactured.

In this manner, in the thermistor 1 of the present embodiment, since the intermediate oxynitride layer 3a is a metal oxynitride layer formed through oxidation of the thermistor material of the base thermistor layer 3 immediately below the intermediate oxynitride layer, the intermediate oxynitride layer 3a has the same constituent elements as those of the base thermistor layer 3 except for oxygen. In addition, the high-quality main metal nitride film layer 4 consisting of common elements except for oxygen can be formed, the intermediate oxynitride layer 3a of the metal oxynitride layer functions as a barrier layer for suppressing an influence due to moisture or impurities in the base thermistor layer 3 or defects of the base thermistor layer, and a main metal nitride film layer 4 having a small change in resistance value even after a heat resistance test can be obtained.

Accordingly, when a heat resistance test is performed, an influence due to moisture or impurities in the base thermistor layer 3 or defects of the base thermistor layer on a main metal nitride film layer is suppressed by the intermediate oxynitride layer 3a. Therefore, the change in resistance value can be further suppressed compared to a case where the main metal nitride film layer 4 is directly formed on the substrate 2.

In addition, by making the base thermistor layer 3 and the main metal nitride film layer 4 have the same composition, a main metal nitride film layer having high crystallinity and high reliability can be formed. By making the compositional ratios of A/(M+A) the same, the lattice constants of both layers become the same, and a difference in internal stress between both layers becomes extremely small, thereby the difference in thermal expansion becoming extremely small. Accordingly, higher reliability can be obtained.

Furthermore, since the base thermistor layer 3 and the main metal nitride film layer 4 are formed of M-A-N (where M represents at least one of Ti, V, Cr, Mn, Fe, Co, Ni and Cu, and A represents Al or (Al and Si)), M'-Al—N (where M' represents at least one of Zr, Nb, Mo, Hf, Ta and W), or G-A'-Al—N (where G represents at least one of Ti, V, Cr, Mn, Fe and Co, and A' represents at least one of Sc, Zr, Mo, Nb and W) and a crystal structure of the main metal nitride film layer is a hexagonal wurtzite-type single phase, a film with a high B constant can be obtained.

Furthermore, even if the substrate 2 is an insulating film which is an organic substrate such as polyimide, a favorable main metal nitride film layer 4 can be obtained. In addition, since the substrate 2 is an insulating film, if the base thermistor layer 3, intermediate oxynitride layer 3a, and main metal nitride film layer 4 which have flexibility are formed, all the layers can have flexibility. Therefore, the layers can be used as a flexible thermistor that can be, for example, installed in a bent state.

By employing a polyimide film which can be used even at a temperature of 200° C. or higher and has extremely excellent heat resistance, a flexible thermistor sensor which can be used even at a temperature of 200° C. or higher can be obtained.

In the thermistor sensor 10 of the present embodiment, since the thermistor sensor includes the above-described thermistor 1, a thermistor sensor having favorable thermistor characteristics, a high B constant, and a small change in resistance value even after a heat resistance test is obtained.

In addition, in the method for manufacturing a thermistor of the present embodiment, since the intermediate oxynitride layer 3a is formed by oxidizing a surface of the base thermistor layer 3 in the intermediate oxynitride layer forming step, it is unnecessary to prepare a sputtering target or the like separately to provide a film forming step for the intermediate oxynitride layer. Therefore, the intermediate oxynitride layer 3a of the metal oxynitride layer can be easily obtained at low cost.

In addition, since the surface oxidation temperature of the base thermistor layer 3 may be lower than or equal to 200° C., an insulating film which is an organic substrate such as polyimide can be used as the substrate 2.

Next, a second embodiment of a thermistor and a method for manufacturing the same according to the present invention will be described below with reference to FIG. 6. In the following description of the embodiment, the same constituent elements as those described in the above-described embodiment will be denoted by the same reference numeral, and the description thereof will not be repeated.

The difference between the first embodiment and the second embodiment is as follows. An intermediate stacked portion 27 includes plural pairs of two layers of a base thermistor layer 3 and an intermediate oxynitride layer 3a in this order which are repeatedly stacked on a substrate 2 as shown in FIG. 6 in a thermistor 21 and a method for manufacturing the same according to the second embodiment whereas the intermediate stacked portion 7 includes one base thermistor layer 3 and one intermediate oxynitride layer 3a stacked in the first embodiment.

That is, in the second embodiment, a main metal nitride film layer 4 is formed on the intermediate oxynitride layer 3a which is an uppermost portion of the intermediate stacked portion 27.

In the second embodiment, an intermediate stacked portion forming step includes two steps of a base thermistor layer forming step and an intermediate oxynitride layer forming step which are repeated plural times.

For example, the intermediate stacked portion 27 is formed by repeatedly stacking the two layers of the base thermistor layer 3 and the intermediate oxynitride layer 3a twice as shown in FIG. 6. That is, the intermediate stacked portion 27 has a 4-layer structure in which the base thermistor layer 3, the intermediate oxynitride layer 3a, the base thermistor layer 3, and the intermediate oxynitride layer 3a are stacked on the substrate 2 in this order.

The intermediate stacked portion may be formed by repeatedly stacking two layers of the base thermistor layer 3 and the intermediate oxynitride layer 3a three times or more. In this case, the intermediate stacked portion 27 has a 6-layer structure including three base thermistor layers 3 and three intermediate oxynitride layers 3a which are alternately stacked on the substrate 2.

In this manner, in the thermistor 21 and the method for manufacturing the same according to the second embodiment, since the intermediate stacked portion 27 includes plural pairs of the two layers of the base thermistor layer 3 and the intermediate oxynitride layer 3a in this order which are repeatedly stacked on the substrate 2, the effect as a barrier layer can be further improved.

Working Examples

Next, results of evaluation of the thermistor, the method for manufacturing the same, and the thermistor sensor according to the present invention performed using working examples manufactured based on the above-described embodiment will be specifically described with reference to FIGS. 2 to 5.

<Manufacture of Film Evaluation Element>

As working examples of the present invention and comparative examples, thermistor sensors shown in FIGS. 2(a) and (b) were manufactured as follows as film evaluation elements.

First, as working examples of the present invention, each base thermistor layer 3 which was a Ti—Al—N film ($Al_{0.85}Ti_{0.15}N$) and had a film thickness of 6 nm or 10 nm was formed on a substrate 2 of a polyimide substrate using a Ti—Al alloy target, of which a compositional ratio of Al/(Ti+Al) was set to 0.85, through a reactive sputtering method, and then, the surface of each base thermistor layer 3 was naturally oxidized for 5 minutes in atmospheric air to form intermediate oxynitride layers 3a which were made of metal oxynitride layers. The oxidation temperature at this time was set to any of room temperature, 150° C., and 200° C. In the case where the oxidation temperature was 150° C. or 200° C., the time was set to 30 minutes.

Crystalline Ti—Al—N films (main metal nitride film layers 4 of $Al_{0.85}Ti_{0.15}N$) which had thermistor characteristics and a film thickness of 94 nm or 90 nm were further formed on the respective intermediate oxynitride layers 3a using a Ti—Al alloy target, of which a compositional ratio of Al/(Ti+Al) was set to 0.85, through the reactive sputtering method. The film thickness of a main metal nitride film layer 4 was set to 94 nm in a case where the film thickness of the base thermistor layer 3 before oxidation was set to 6 nm, and the film thickness of a main metal nitride film layer 4 was set to 90 nm in a case where the film thickness of the base thermistor layer 3 before oxidation was set to 10 nm. The layers are formed so that the total film thickness of the base thermistor layer 3 before oxidation and the main metal nitride film layer 4 became 100 nm.

Next, counter electrodes 5 were formed on each of the above-described main metal nitride film layers 4 under the above-described conditions to obtain film evaluation elements of the working examples of the present invention.

Film evaluation elements obtained by forming Ti—Al—N metal nitride film having a film thickness of 100 nm on substrates 2 of polyimide substrates were similarly manufactured as comparative examples using a Ti—Al alloy target, of which a compositional ratio of Al/(Ti+Al) was set to 0.85, through the reactive sputtering method. The films of the comparative examples do not have an intermediate oxynitride layer including a metal oxynitride layer.

<Specific Resistance Measurement>

Specific resistance of the comparative examples and each of the working examples of the present invention at 25° C. was measured through a 4-terminal method (van der Pauw method). The results are shown in Table 2. In Table 2, the intermediate oxynitride layer is described as an oxynitride layer.

TABLE 2

| | Stacked structure | Oxidation temperature | Specific resistance (kΩ) at 25° C. | B25-50(K) | Resistance value increase rate (%) at 25° C. after heat resistance test at 250° C. for 1000 h | B constant change rate (%) after heat resistance test at 250° C. for 1000 h |
|---|---|---|---|---|---|---|
| Comparative Example 1 | Al0.85Ti0.15N 100 nm | — | 102 | 2740 | 5.8% | <1 |
| Comparative Example 2 | Al0.85Ti0.15N 100 nm | — | 315 | 2680 | 4.8% | <1 |
| Working Example 1 | Al0.85Ti0.15N 6 nm/ oxynitride layer/ Al0.85Ti0.15N 94 nm | Room temperature | 304 | 2678 | 1.8% | <1 |
| Working Example 2 | Al0.85Ti0.15N 6 nm/ oxynitride layer/ Al0.85Ti0.15N 94 nm | 150° C. | 298 | 2672 | 2.2% | <1 |
| Working Example 3 | Al0.85Ti0.15N 6 nm/ oxynitride layer/ Al0.85Ti0.15N 94 nm | 200° C. | 313 | 2681 | 2.5% | <1 |
| Working Example 4 | Al0.85Ti0.15N 10 nm/ oxynitride layer/ Al0.85Ti0.15N 90 nm | Room temperature | 304 | 2670 | 1.9% | <1 |
| Working Example 5 | Al0.85Ti0.15N 10 nm/ oxynitride layer/ Al0.85Ti0.15N 90 nm | 150° C. | 304 | 2676 | 2.0% | <1 |
| Working Example 6 | Al0.85Ti0.15N 10 nm/ oxynitride layer/ Al0.85Ti0.15N 90 nm | 200° C. | 318 | 2682 | 2.1% | <1 |

<B Constant Measurement>

Resistance values of each film evaluation element at 25° C. and 50° C. were measured in a constant-temperature tank to calculate a B constant from the resistance values at 25° C. and 50° C. The results are also shown in Table 2. In addition, it is confirmed from the resistance values at 25° C. and 50° C. that the examples are thermistors having negative temperature characteristics.

In the method for calculating a B constant according to the present invention, the B constant is obtained from the resistance values at 25° C. and 50° C. as described above using the following equation.

$$B\ \text{constant}(K)=\ln(R25/R50)/(1/T25-1/T50)$$

R25 (Ω): Resistance value at 25° C.
R50 (Ω): Resistance value at 50° C.
T25 (K): 298.15 K which indicates absolute temperature of 25° C.
T50 (K): 323.15 K which indicates absolute temperature of 50° C.

In addition, in the working examples and comparative examples, the resistance value increase rate and the B constant change rate at 25° C. were examined after a heat resistance test at 250° C. for 1,000 h was performed. The results are shown in Table 2 and FIG. 3.

The "Comparative Example 100 nm", "Example 6 nm/Oxynitride Layer/94 nm", and "Example 10 nm/Oxynitride Layer/90 nm" in FIG. 3 are respectively "Comparative Example 1", "Working Example 1", and "Working Example 4" in Table 2.

As can be seen from these results, high resistivity and B constant are obtained from both of the working examples of the present invention and the comparative examples. However, in all of the working examples of the present invention, the increase rate of the resistance value at 25° C. after the heat resistance test is suppressed to be lower than that of the comparative examples.

A cross-sectional TEM image (bright-field image) of the working examples taken by a transmission electron microscope (TEM) is shown in FIG. 4.

In addition, a high-angle annular dark field (HAADF) image and TEM-EDS images of oxygen, nitrogen, Al, and Ti with respect to the working examples of the present invention are shown in FIG. 5.

In these working examples, a base thermistor layer (film thickness of 10 nm) and a main metal nitride film layer (film thickness of 90 nm) of which a compositional ratio of Al/(Ti+Al) is set to 0.85 are employed.

In addition, in FIG. 5, an intermediate oxynitride layer is described as an oxynitride layer.

As can be seen from the cross-sectional TEM image, a favorable columnar crystalline main metal nitride film layer is obtained.

In addition, it can be seen from the TEM-EDS image of oxygen that a large amount of oxygen is detected in the intermediate oxynitride layer (oxynitride layer). From the fact that nitrogen is detected even in the intermediate oxynitride layer having oxygen in the TEM-EDS image of nitrogen, it can be seen that this intermediate oxynitride layer is an oxynitride layer. This intermediate oxynitride layer is a metal oxynitride layer formed through oxidation of the surface of the base thermistor layer (Ti—Al—N). The film thickness of this intermediate oxynitride layer is about 1 nm.

The main metal nitride film layer is formed on this intermediate oxynitride layer. From initial crystal growth of Ti—Al—N immediately after the start of the formation of the main metal nitride film layer, in crystalline Ti—Al—N having a wurtzite-type crystal structure having a high crystal orientation degree, a columnar crystallized film having an extremely small nitrogen defect amount is obtained, high crystallinity is obtained, and a high B constant is obtained.

It is considered that oxygen detected in the vicinity of the interface between the polyimide substrate and the base thermistor layer (Ti—Al—N) is due to, for example, an effect of oxidation of the surface of the polyimide substrate in atmospheric air before film formation.

Next, a thermistor (Working Example 8) including an intermediate stacked portion obtained by repeatedly stacking two layers of a base thermistor layer and an intermediate oxynitride layer in this order on a polyimide substrate twice and thermistors (Working Examples 9 and 10) including an intermediate stacked portion obtained by repeatedly stacking two layers of a base thermistor layer and an intermediate oxynitride layer in this order on a substrate three times were manufactured as working examples of the second embodiment to be evaluated in the same manner as above. A thermistor (Working Example 7) including an intermediate stacked portion by stacking two layers of a base thermistor layer and an intermediate oxynitride layer in this order on a substrate once is also evaluated in the same manner as a working example of the first embodiment.

Compositional ratios of Al/(Ti+Al) in all of the base thermistor layers and the main metal nitride film layers of the above-described Working Examples 7 to 10 are set to 0.85.

In Working Example 7, a base thermistor layer having a film thickness of 6 nm and an intermediate oxynitride layer (oxynitride layer) obtained by naturally oxidizing the surface of the base thermistor layer were formed on a substrate, and a 94-nm-thick main metal nitride film layer 4 was formed thereon. In addition, in Working Example 8, a base thermistor layer having a film thickness of 6 nm and an intermediate oxynitride layer (oxynitride layer) obtained by naturally oxidizing the surface of the base thermistor layer were stacked on a substrate, and then, a base thermistor layer having a film thickness of 6 nm and a naturally oxidized intermediate oxynitride layer (oxynitride layer) were further stacked thereon. Thereafter, a main metal nitride film layer having a film thickness of 88 nm was formed thereon. In addition, in Working Example 9, a base thermistor layer having a film thickness of 6 nm and an intermediate oxynitride layer (oxynitride layer) obtained by naturally oxidizing the surface of the base thermistor layer were formed on a substrate, and a base thermistor layer having a film thickness of 3 nm and a naturally oxidized intermediate oxynitride layer (oxynitride layer) were further repeatedly stacked thereon twice. Thereafter, a main metal nitride film layer having a film thickness of 88 nm was formed thereon. Furthermore, in Working Example 10, a base thermistor layer having a film thickness of 6 nm and an intermediate oxynitride layer (oxynitride layer) obtained by naturally oxidizing the surface of the base thermistor layer were formed on a substrate, and a base thermistor layer having a film thickness of 6 nm and a naturally oxidized intermediate oxynitride layer (oxynitride layer) were further repeatedly stacked thereon twice. Thereafter, a main metal nitride film layer having a film thickness of 82 nm was formed thereon.

In all cases, the films were formed so that the total film thickness of base thermistor layers before oxidation and main metal nitride film layers became 100 nm. In addition, the temperature of the above-described natural oxidation was set to room temperature.

The results are shown in Table 3. In Table 3, the intermediate oxynitride layer is described as an oxynitride layer.

In addition, in Tables 2 and 3, for example, the notation of "Al0.85Ti0.15N 6 nm/oxynitride layer/Al0.85Ti0.15N 94 nm" of Working Examples 1 and 7 indicates that a base thermistor layer 3 of a Ti—Al—N film ($Al_{0.85}Ti_{0.15}N$) having a film thickness of 6 nm was formed, the surface of the base thermistor layer was oxidized to form an intermediate oxynitride layer 3a consisting of metal oxynitride, and a main metal nitride film layer 4 of a Ti—Al—N film ($Al_{0.85}Ti_{0.15}N$) having a film thickness of 94 nm was further formed on the intermediate oxynitride layer. That is, it is shown that the total film thickness of the base thermistor layer 3 and the intermediate oxynitride layer 3a is about 6 nm.

As a result, as the initial characteristics, the resistance values at 25° C. in Comparative Example 3 and Working Examples 11 and 12 were respectively 224 kΩ, 242 kΩ, and 241 kΩ, and the B constants were respectively 2583 K, 2580 K, and 2586 K.

In addition, as a result of evaluating the change rate after a heat resistance test at 250° C. for 1,000 h, the resistance value increase rates at 25° C. of Working Examples 11 and 12 were respectively reduced by 2.6% and 2.6% compared to Comparative Example 3, and the absolute value change rates of B constants of Working Examples 11 and 12 were respectively reduced by 0.5% and 0.6% compared to Comparative Example 3, thereby further reducing the change in thermistor characteristics between before and after a heat resistance test to a smaller level.

TABLE 3

| | Stacked structure | Oxidation temperature | Resistance value (kΩ) at 25° C. | B25-50(K) | Resistance value increase rate (%) at 25° C. after heat resistance test at 250° C. for 1,000 h | B constant change rate (%) after heat resistance test at 250° C. for 1,000 h |
|---|---|---|---|---|---|---|
| Working Example 7 | Al0.85Ti0.15N 6 nm/ oxynitride layer/ Al0.85Ti0.15N 94 nm | Room temperature | 356 | 2697 | 2.0% | <1 |
| Working Example 8 | Al0.85Ti0.15N 6 nm/ oxynitride layer/ Al0.85Ti0.15N 6 nm/ oxynitride layer/ Al0.85Ti0.15N 88 nm | Room temperature | 395 | 2701 | 1.5% | <1 |
| Working Example 9 | Al0.85Ti0.15N 6 nm/ oxynitride layer/ Al0.85Ti0.15N 3 nm/ oxynitride layer/ Al0.85Ti0.15N 3 nm/ oxynitride layer/ Al0.85Ti0.15N 88 nm | Room temperature | 394 | 2700 | 1.7% | <1 |
| Working Example 10 | Al0.85Ti0.15N 6 nm/ oxynitride layer/ Al0.85Ti0.15N 6 nm/ oxynitride layer/ Al0.85Ti0.15N 6 nm/ oxynitride layer/ Al0.85Ti0.15N 82 nm | Room temperature | 408 | 2702 | 1.7% | <1 |

As can be seen from these results, high resistivity and B constant are obtained in all of Working Examples 7 to 10 of the present invention. In particular, the increase rate of the resistance value at 25° C. after a heat resistance test in the thermistors including an intermediate stacked portion obtained by repeatedly stacking two layers of a base thermistor layer and an intermediate oxynitride layer in this order on a substrate twice or three times (Working Examples 8, 9, and 10) is suppressed to be lower than that of the thermistor including an intermediate stacked portion obtained by stacking two layers of a base thermistor layer and an intermediate oxynitride layer in this order on a substrate once (Working Example 7).

Next, the same evaluation was performed on working examples in which the compositional ratio of Al/(Ti+Al) of a base thermistor layer and a main metal nitride film layer was set to 0.80 or 0.75.

Regarding the compositional ratio of Al/(Ti+Al) being 0.80, Comparative Example 3 ($Al_{0.80}Ti_{0.20}N$ (100 nm)) having no intermediate stacked portion, and Working Example 11 ($Al_{0.80}Ti_{0.20}N$ (6 nm)/intermediate oxynitride layer/$Al_{0.80}Ti_{0.20}N$ (94 nm)) and Working Example 12 ($Al_{0.80}Ti_{0.20}N$ (10 nm)/intermediate oxynitride layer/$Al_{0.80}Ti_{0.20}N$ (90 nm)), which had an intermediate stacked portion, were evaluated. The oxidation temperature was set to room temperature.

Regarding the compositional ratio of Al/(Ti+Al) being 0.75, Comparative Example 4 ($Al_{0.75}Ti_{0.25}N$ (100 nm)) having no intermediate stacked portion, and Working Example 13 ($Al_{0.75}Ti_{0.25}N$ (6 nm)/intermediate oxynitride layer/$Al_{0.75}Ti_{0.25}N$ (94 nm)) and Working Example 14 ($Al_{0.75}Ti_{0.25}N$ (10 nm)/intermediate oxynitride layer/$Al_{0.75}Ti_{0.25}N$ (90 nm)), which had an intermediate stacked portion, were evaluated. The oxidation temperature was set to room temperature.

As a result, as the initial characteristics, the resistance values at 25° C. in Comparative Example 4 and Working Examples 13 and 14 were respectively 9 kΩ, 8 kΩ, and 7 kΩ, and the B constants were respectively 2029 K, 2024 K, and 2020 K.

In addition, as a result of evaluating the change rate after a heat resistance test at 250° C. for 1,000 h, the resistance value increase rates at 25° C. of Working Examples 13 and 14 were respectively reduced by 1.6% and 2.6% compared to Comparative Example 4, and the absolute value change rates of B constants of Working Examples 13 and 14 were respectively reduced by 0.7% and 0.5% compared to Comparative Example 4, thereby further reducing the change in thermistor characteristics between before and after a heat resistance test to a smaller level.

The technical scope of the present invention is not limited to the above-described embodiments and working examples, and various modifications can be made within the scope not departing from the gist of the present invention.

For example, a base thermistor layer and a main metal nitride film layer preferably has the same composition as described above. However, a base thermistor layer and a main metal nitride film layer may be films having the same constituent elements and different compositions.

In addition, in a case where a plurality of base thermistor layers are provided, at least one layer among the plurality of base thermistor layers may have a composition different from the other layers.

Furthermore, an intermediate oxynitride layer may be formed through sputtering. That is, when forming an intermediate oxynitride layer on a base thermistor layer, an intermediate oxynitride film may be formed by forming the intermediate oxynitride layer through sputtering in a mixed gas atmosphere containing oxygen gas and nitrogen gas.

REFERENCE NUMERALS 1, 21 Thermistor, 2 Substrate, 3 Base thermistor layer, 3a Intermediate oxynitride layer, 4 Main metal nitride film layer, 7, 27 Intermediate stacked portion, 10 Thermistor sensor

What is claimed is:

1. A thermistor formed on a substrate, the thermistor comprising:
    an intermediate stacked portion formed on the substrate; and
    a main metal nitride film layer formed of a thermistor material of a metal nitride on the intermediate stacked portion,
    wherein the intermediate stacked portion includes one or plural pairs of two layers which are a base thermistor layer formed of a thermistor material of a metal nitride and an intermediate oxynitride layer formed on the base thermistor layer and are stacked,
    wherein the main metal nitride film layer is formed on the intermediate oxynitride layer which is an uppermost portion of the intermediate stacked portion, and
    wherein the intermediate oxynitride layer is a metal oxynitride layer formed through oxidation of the thermistor material of the base thermistor layer immediately below the intermediate oxynitride layer.

2. The thermistor according to claim 1,
    wherein the base thermistor layer and the main metal nitride film layer have the same composition.

3. The thermistor according to claim 1,
    wherein the intermediate stacked portion includes plural pairs of two layers of the base thermistor layer and the intermediate oxynitride layer in this order which are repeatedly stacked on the substrate.

4. The thermistor according to claim 1,
    wherein the base thermistor layer and the main metal nitride film layer are formed of M-A-N (where M represents at least one of Ti, V, Cr, Mn, Fe, Co, Ni and Cu, and A represents Al or (Al and Si)), M'-Al—N (where M' represents at least one of Zr, Nb, Mo, Hf, Ta and W), or G-A'-Al—N (where G represents at least one of Ti, V, Cr, Mn, Fe and Co, and A' represents at least one of Sc, Zr, Mo, Nb and W), and
    wherein a crystal structure of the main metal nitride film layer is a hexagonal wurtzite-type single phase.

5. The thermistor according to claim 4,
    wherein the base thermistor layer and the main metal nitride film layer are formed of M-A-N, the M element in the M-A-N is Ti, and the A element is Al.

6. The thermistor according to claim 1,
    wherein the substrate is an insulating film.

7. A thermistor sensor comprising:
    the thermistor according to claim 1; and
    a pair of counter electrodes formed on the main metal nitride film layer opposite to each other.

8. A method for manufacturing the thermistor according to claim 1, the method comprising:
    an intermediate stacked portion forming step of forming an intermediate stacked portion on a substrate; and
    a main metal nitride film layer forming step of forming the main metal nitride film layer with a thermistor material of a metal nitride on the intermediate stacked portion,
    wherein the intermediate stacked portion forming step includes two steps which are a base thermistor layer forming step of forming the base thermistor layer with a thermistor material of a metal nitride and an intermediate oxynitride layer forming step of forming an intermediate oxynitride layer on the base thermistor layer and are performed once or repeated plural times,
    wherein in the main metal nitride film layer forming step, the main metal nitride film layer is formed on the intermediate oxynitride layer which is an uppermost portion of the intermediate stacked portion, and
    wherein in the intermediate oxynitride layer forming step, the intermediate oxynitride layer is formed by oxidizing a surface of the base thermistor layer.

9. The method for manufacturing a thermistor according to claim 8,
    wherein in the intermediate stacked portion forming step, the two steps of the base thermistor layer forming step and the intermediate oxynitride layer forming step are repeated plural times in this order.

* * * * *